3,096,322
AMINOBENZENESULFONAMIDE AZO DYES FOR ACRYLIC FIBERS
James M. Straley and Raymond C. Harris, Kingsport, Tenn., assignors to Eastman Kodak Company, Rochester, N.Y., a corporation of New Jersey
No Drawing. Filed Mar. 14, 1960, Ser. No. 14,560
6 Claims. (Cl. 260—204)

This invention relates to new azo compounds and their application to the art of dyeing or coloring acrylic fibers. The invention also relates to the new aminobenzenesulfonamide compounds used in preparing the new azo compounds of the invention and to their preparation.

As well known, polyacrylonitrile fibers are difficult to dye and their dyeing has presented problems. The polyacrylonitrile fibers commercially available usually contain over 85% polyacrylonitrile and few of the dyes offered for sale show affinity therefor. Thus, for example, the usual cellulose acetate disperse dyes have little or no affinity for polyacrylonitrile fibers.

It is an object of the invention to provide new azo dyestuffs. Another object is to provide new azo dyestuffs having affiinity for polyacrylonitrile fibers. A further object is to provide dyed polyacrylonitrile materials having good fastness to light, gas, washing, and sublimation. Another object is to provide new aminobenzenesulfonamide compound. A further object is to provide a satisfactory process for preparing the new azo and the new aminobenzenesulfonamide compounds of the invention.

The new azo compounds of the invention have the formula:

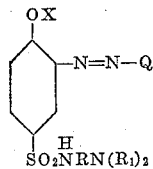

wherein X represents a member selected from the group consisting of a methyl radical and an ethyl radical, R represents an alkylene radical having 2 to 3 carbon atoms, $R_1$ represents an alkyl radical having 1 to 4 carbon atoms, $N(R_1)_2$ collectively represents a member selected from the group consisting of the morpholinyl radical and the piperidyl radical and Q represents a β-naphthol radical devoid of a water-solubilizing group. They dye acrylic fibers, such as Verel and Orlon 42, red, orange and scarlet shades, for example, having good fastness to light, gas, washing, and sublimation.

The new azo compounds of the invention are prepared by diazotizing an aminobenzenesulfonamide compound having the formula:

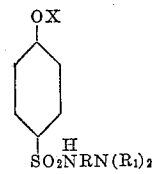

wherein X, R, $R_1$ and $N(R_1)_2$ have the meaning previously assigned to them and coupling the diazonium compound obtained with a β-naphthol compound which is devoid of a water-solubilizing group. The aminobenzenesulfonamide compounds are new compounds. Their preparation is described hereinafter.

While any β-naphthol compound which is devoid of a water-solubilizing group and which is capable of coupling can be employed the use of N-aryl derivatives of 2-naphthol-3-carboxamide, commonly referred to as Naphthol AS compounds, is preferred. Representative aminobenzenesulfonamide and β-naphthol compounds are disclosed hereinafter. $R_1$ may be, for example, a methyl, an ethyl, a propyl or a butyl radical.

3-amino-4-methoxy-N-β-dimethylaminoethylbenzenesulfonamide,
3-amino-4-methoxy-N-β-diethylaminoethylbenzenesulfonamide,
3-amino-4-methoxy-N-β-di(n-propyl)aminoethylbenzensulfonamide,
3-amino-4-methoxy-N-β-di(n-butyl)aminoethylbenzenesulfonamide,
3-amino-4-methoxy-N-γ-dimethylaminopropylbenzenesulfonamide,
3-amino-4-methoxy-N-γ-diethylaminopropylbenzenesulfonamide,
3-amino-4-methoxy-N-γ-di(n-propyl)aminopropylbenzenesulfonamide,
3-amino-4-methoxy-N-γ-di(n-butyl)aminopropylbenzenesulfonamide,
3-amino-4-methoxy-N-β-morpholinylethylbenzenesulfonamide,
3-amino-4-methoxy-N-γ-morpholinylpropylbenzenesulfonamide,
3-amino-4-methoxy-N-β-piperidylethylbenzenesulfonamide,
3-amino-4-methoxy-N-γ-piperidylpropylbenzenesulfonamide,
3-amino-4-ethoxy-N-β-dimethylaminoethylbenzenesulfonamide,
3-amino-4-ethoxy-N-γ-dimethylaminopropylbenzenesulfonamide,
3-amino-4-methoxy-N-β-(methyl,ethyl)aminoethylbenzenesulfonamide and
3-amino-4-methoxy-N-γ-(methyl,ethyl)aminopropylbenzenesulfonamide are representative of the aminobenzenesulfonamide compounds used in preparing the new azo compounds of the invention. The aminobenzenesulfonamide compounds are believed to be new and their preparation is described herein.

β-Naphthol, 6-bromo-2-hydroxynaphthalene, 3-methoxy-2-hydroxynaphthalene, 2-hydroxynaphthalene-7-sulfonamide, 2-hydroxy-3-naphthoic anilide (Naphthol AS), 2-hydroxy-3-naphthoic-o-toluidide (Naphthol ASD), 2-hydroxy-3-naphthoic-p-toluidide, 2-hydroxy-3-naphthoic-o-anisidide (Naphthol ASOL), 2-hydroxy-3-naphthoic-p-anisidide, 2-hydroxy-3-naphthoic-m-nitranilide (Naphthol ASBS), 2-hydroxy-3-naphthoic-p-chloroanilide, 2-hydroxy-3-naphthoic-o-phenetidide (Naphthol ASPN), 2-hydroxy-3-naphthoic-p-ethoxyanilide, the 2,4-dimethoxy-5-chloroanilide of 2-hydroxy-3-naphthoic acid, the 2,5-dimethoxyanilide of 2-hydroxy-3-naphthoic acid, the 2-methyl-4-chloroanilide of 2-hydroxy-3-naphthoic acid, the 2,5-dimethoxy-4-chloroanilide of 2-hydroxy-3-naphthoic acid, the 2,4-dimethoxy-5-bromoanilide of 2-hydroxy-3-naphthoic acid, the 2,5-dimethoxy-4-bromoanilide of 2-hydroxy-3-naphthoic acid, the 2,5-diethoxy-4-chloroanilide of 2-hydroxy-3-naphthoic acid, the 2,5-diethoxyanilide of 2-hydroxy-3-naphthoic acid, the 2,5-dimethoxy-4-chloroanilide of 6-bromo-2-hydroxy-3-naphthoic acid, the 2,4-dimethoxy-5-chloroanilide of 6-bromo-2-hydroxy-3-naphthoic acid, the 2,4-dimethoxy-5-chloroanilide of 6-methoxy-2-hydroxy-3-naphthoic acid, 2-hydroxy-3-naphthoic-α-naphthylamide and 2-hydroxy-3-naphthoic-β-naphthylamide (Naphthol ASSW) are illustrative of the β-naphthol coupling components used in preparing the azo compounds of the invention.

The following examples illustrate the invention.

Example 1

20 grams of 3-amino-4-methoxy-N-γ-dimethylaminopropylbenzenesulfonamide were dissolved in 35 cc. of concentrated hydrochloric acid and 135 cc. of water and the temperature was brought to 0° C. A solution of 5.55 grams of sodium nitrite in 10 cc. of water was added, with stirring, at a temperature below 5° C. and the resulting solution was kept at a temperature below 10° C. for 1.5 hours while stirring. The excess nitrous acid was destroyed with sulfamic acid.

25 grams of the 2,4-dimethoxy-5-chloroanilide of 2-hydroxy-3-naphthoic acid were dissolved in 350 cc. of water containing 21 cc. of a 20% aqueous sodium hydroxide solution by good stirring.

1.5 grams of a detergent and wetting agent, such as Igepon T [$C_{17}H_{33} \cdot CO \cdot N(CH_3) \cdot C_2H_4 \cdot SO_3Na$] in 140 cc. of water were added. The volume was brought to 2,450 cc. by the addition of chipped ice, and the mixture was cooled to 0° C. 16 cc. of glacial acetic acid were added all at once with efficient stirring after which the diazo solution prepared as described above was added while maintaining the temperature of the reaction mixture below 10° C. Upon completion of the coupling reaction which takes place the mineral acid present was made neutral to Congo red paper by the addition of sodium acetate and the product which precipitated was recovered by filtration, washed well with water and air-dried. The dye compound thus obtained has the formula:

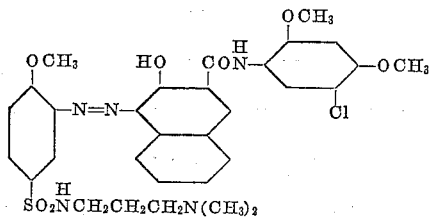

It dyes textile materials made of Verel and Orlon acrylic fibers red shades having excellent fastness to light, gas, washing and sublimation.

Example 2

20 grams of 3-amino-4-methoxy-N-γ-dimethylaminopropylbenzenesulfonamide were dissolved in 35 cc. of concentrated hydrochloric acid and 135 cc. of water and the temperature was brought to 0° C. A solution of 5.55 grams of sodium nitrite in 10 cc. of water was added, with stirring, at a temperature below 5° C. and the resulting solution was kept at a temperature below 10° C. for 1.5 hours while stirring. The excess nitrous acid was destroyed with sulfamic acid.

A coupler solution was prepared by dissolving 12.5 grams of the sodium salt of β-naphthol in 500 cc. of water and then bringing the volume to 1500 cc. by the addition of ice. The diazo solution prepared as described above was added to the coupler solution at a temperature below 10° C. with good stirring. The mineral acid present was made neutral to Congo red paper by the addition of sodium acetate and the product which precipitated was recovered by filtration, washed well with water and air-dried. The dye compound obtained dyes textile materials made of Verel and Orlon acrylic fibers bright orange shades which have excellent fastness to light, gas, washing and sublimation.

Example 3

20.7 grams of 3-amino-4-methoxy-N-β-diethylaminoethylbenzenesulfonamide was diazotized and the diazonium compound obtained was coupled with 19.4 grams of the o-toluidide of 2-hydroxynaphthoic acid. Diazotization, coupling and recovery of the dye compound formed were carried out in accordance with the procedure described in Example 1. The dye compound obtained colors textile materials made of Verel and Orlon acrylic fibers red shades having excellent fastness to light, gas, washing and sublimation.

Example 4

23.9 grams of 3-amino-4-ethoxy-N-β-piperidylethylbenzenesulfonamide were diazotized and the diazonium compound obtained was coupled with 21 grams of the p-anisidide of 2-hydroxy-3-naphthoic acid. Diazotization, coupling and recovery of the dye compound formed were carried out in accordance with the procedure described in Example 1. The dye compound obtained colors textile materials made of Verel and Orlon acrylic fibers red shades having excellent fastness to light, gas, washing and sublimation.

Example 5

3.63 grams of 3-acetamino-4-methoxy-N-γ-dimethylaminopropylbenzenesulfonamide were added to 50 cc. of concentrated hydrochloric acid and 100 cc. of water, and the resulting mixture was refluxed for 2 hours. The resulting solution was cooled to 0° C. and the 3-amino-4-methoxy-N-γ-dimethylaminopropylbenzenesulfonamide present therein was diazotized by the addition of 0.72 gram of sodium nitrite in 10 cc. of water. Diazotization was carried out at a temperature below 5° C. for 1.5 hours while stirring. The diazo solution thus prepared was run into a solution of 2.71 grams of 6-bromo-2-hydroxynaphthalene in 100 cc. of 3% NaOH containing 100 grams of cracked ice. Upon completion of the coupling reaction which takes place the mineral acid present was made neutral to Congo red paper by the addition of sodium carbonate and the dye compound which precipitated was recovered by filtration, washed well with water and dried. The dye compound obtained dyes textile materials made of Verel and Orlon acrylic fibers red shades having excellent fastness to light, gas, washing and sublimation.

Example 6

Example 5 was repeated using 2.63 grams of the anilide of 2-hydroxy-3-naphthoic acid as the coupler instead of 6-bromo-2-hydroxynaphthalene. The dye compound obtained dyes textile materials made of Verel and Orlon acrylic fibers bright red shades having excellent fastness to light, gas, washing and sublimation.

Example 7

3.7 grams of 3-acetamino-4-methoxy-N-β-diethylaminoethylbenzenesulfonamide were diazotized and the diazonium compound obtained was coupled with 1.74 grams of 3-methoxy-2-hydroxynaphthalene. Diazotization, coupling and recovery of the dye compound formed were carried out in accordance with the procedure set forth in Example 5. The dye compound obtained dyes textile materials made of Verel and Orlon acrylic fibers bright red shades having excellent fastness to light, gas, washing and sublimation.

Example 8

3.5 grams of 3-acetamino-4-ethoxy-N-β-dimethylaminoethylbenzenesulfonamide were diazotized and the diazonium compound obtained was coupled with 2.3 grams of 2-hydroxynaphthalene-7-sulfonamide. Diazotization, coupling and recovery of the dye compound formed were carried out in accordance with the procedure set forth in Example 5. The dye compound obtained dyes textile materials made of Verel and Orlon acrylic fibers scarlet shades having excellent fastness to light, gas, washing and sublimation.

The following tabulation further illustrates the azo compounds of the invention together with the color they produce on polyacrylonitrile textile materials, such as those made, for example, from Verel or Orlon acrylic fibers. The azo compounds indicated below are prepared by diazotizing the amines listed under the heading "Amine" and coupling the diazonium compounds obtained with the compounds specified in the column entitled "Coupling Component." The diazotization, coupling and recovery operations are carried out in accordance with the procedure described in Example 1.

| Amine | Coupling Component | Color |
|---|---|---|
| 3-amino-4-methoxy-N-γ-dimethylaminopropyl-benzenesulfonamide. | 2-hydroxy-3-naphthoic anilide. | red. |
| Do | 2-hydroxy-3-naphthoic o-anisidide. | Do. |
| Do | 2-hydroxy-3-naphthoic p-toluidide. | Do. |
| Do | 2-hydroxy-3-naphthoic p-chloroanilide. | Do. |
| Do | 2-hydroxy-3-naphtholc-o-phenetidide. | Do. |
| Do | 2-hydroxy-3-naphthoic-(2'-methyl-4'-chloro) anilide. | Do. |
| 3-amino-4-methoxy-N-β-piperidylbenzenesulfonamide. | 2-hydroxy-3-naphthoic anilide. | Do. |
| Do | 6-bromo-2-hydroxy-naphthalene. | orange. |
| 3-amino-4-methoxy-N-β-morpholinylbenzenesulfonamide. | 2-hydroxy-3-naphthoic anilide. | red. |
| Do | β-naphthol | Do. |
| 3-amino-4-methoxy-N-γ-dimethylaminopropyl-benzenesulfonamide. | 2-hydroxy-3-naphthoic-o-toluidide. | Do. |
| Do | 2-hydroxy-3-naphthoic-α-naphthylamide. | Do. |
| 3-amino-4-ethoxy-N-β-dimethylaminoethyl-benzenesulfonamide. | 2-hydroxy-3-naphthoic anilide. | Do. |

The new aminobenzenesulfonamide compounds of the invention are prepared by the following series of reactions. The o-alkoxyaniline compounds having the formula:

(A) 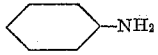

are acetylated to obtain compounds having the formula:

(B) 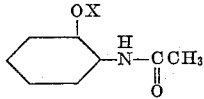

The compounds having the Formula B are treated with chlorosulfonic acid to form the benzenesulfonyl chloride compounds having the formula:

(C) 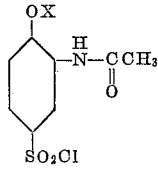

The compounds having the formula C are reacted with an amine having the formula:

(D) $H_2NRN(R_1)_2$ to form compounds having the formula:

(E) 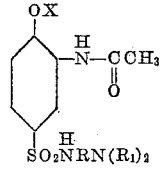

The acetyl group of the compounds having the Formula E is removed by alkaline hydrolysis to obtain the new aminobenzenesulfonamide compounds of the invention. X, R, $R_1$ and $N(R_1)_2$ have the meaning previously assigned to them.

β-Dimethylaminoethylamine [$H_2NCH_2CH_2N(CH_3)_2$], β-diethylaminoethylamine, β-di-n-propylaminoethylamine [$H_2NCH_2CH_2N(n-C_3H_7)_2$], β-di-n-butylaminoethyl- amine γ-dimethylaminopropylamine, γ-diethylaminopropylamine, γ-di-n-propylaminopropylamine, γ-di-n-butylaminopropylamine

[$H_2NCH_2CH_2CHN(n-C_4H_9)_2$]

β-piperidylethylamine, γ-piperidylpropylamine, β-morpholinylethylamine, γ-morpholinylpropylamine

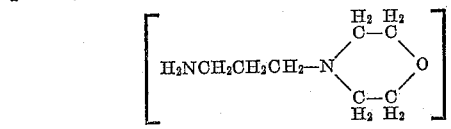

β-methylethylaminoethylamine

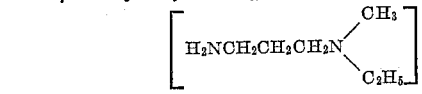

and γ-methylethylaminopropylamine

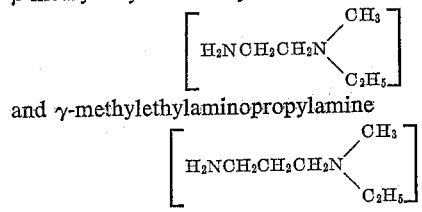

are illustrative of the amine compounds having the Formula D.

*Example 9*

(A) 41.25 grams of N-acetyl-o-anisidine were added below 15° C., with stirring, to 145 cc. of freshly distilled chlorosulfonic acid. The temperature of the reaction mixture was then raised to 60° C. during 2 hours and then allowed to fall to room temperature. The reaction mixture was then poured into 500 grams of cracked ice with vigorous stirring. Ice was added as necessary to keep the temperature below 20° C. The product (3-acetamino-4-methoxybenzenesulfonyl chloride) which precipitated was recovered by filtration and washed thoroughly with ice water.

(B) The slightly moist 3-acetamino-4-methoxybenzenesulfonyl chloride obtained as described in A was added in small portions to 130 cc. of γ-dimethylaminopropylamine with vigorous stirring. Considerable heat was generated and after about 15 minutes a crystalline solid began to separate. After about 4 hours stirring when the temperature had dropped to about room temperature a solution of 30 grams of sodium carbonate in 125 cc. was added, with stirring. The product which separated was recovered by filtration, washed with water and dried. 69 grams of 3-acetamino-4-methoxy-N-γ-dimethylaminopropylbenzenesulfonamide were recovered as a white solid.

(C) A mixture of the 69 grams of 3-acetamino-4-methoxy-N-γ-dimethylaminopropylbenzenesulfonamide obtained in B, 400 cc. of absolute ethyl alcohol and 87.5 cc. of concentrated HCl was refluxed for 2.5 hours. The alcohol was distilled off, 100 cc. of water were added and the mineral acid present was neutralized with sodium carbonate. 3-amino-4-methoxy-N-γ-dimethylaminopropylbenzenesulfonamide was obtained as a gummy solid. It was washed well with water by decantation and air-dried.

(D) If the diazo component is to be stored it is more easily handled in its hydrochloride salt form which is prepared as follows. In C, after refluxing for 2.5 hours, 250 cc. of alcohol-water azeotrope were distilled off while replacing it with 250 cc. of absolute ethyl alcohol. Dry HCl was bubbled vigorously into the reaction mixture for 5 minutes and then 800 cc. of azeotrope was distilled off replacing it with an equal volume of absolute ethyl alcohol. The reaction mixture was then concentrated under vacuum until a heavy precipitate formed. The reaction mixture was cooled and the reaction product, the dihydrochloride of the product of C, was recovered by filtration and dried at 60° C. 62 grams of a light tan colored solid melting at 189° C. (dec.) which has the correct elementary analysis for C, H, N, O and Cl were obtained.

Example 10

50 grams of 3-acetamino-4-methoxy-N-γ-dimethylaminopropylbenzenesulfonamide prepared as described in Example 9B were added to a solution of 29.5 cc. of concentrated hydrochloric acid and 15 cc. of concentrated $H_2SO_4$ in 205 cc. of water at 75° C. The reaction mixture resulting was then refluxed for one hour, cooled to 40° C. and brought to a pH of 8.5 with dilute aqueous sodium hydroxide. If this pH is exceeded it can be adjusted by alternately adding acetic acid and sodium carbonate. The solution was cooled and sodium chloride was added until no more oil formed. The oily layer was recovered, dissolved in acetone, filtered and the acetone was removed by evaporation. 41 grams of 3-amino-4-methoxy-N-3-dimethylaminopropylbenzenesulfonamide was thus obtained as a viscous oil.

Example 11

138 grams of 3-acetamino-4-methoxy-N-γ-dimethylaminopropylbenzenesulfonamide prepared as described in Example 9B, 800 cc. of ethyl alcohol and 175 cc. of concentrated hydrochloric acid were refluxed together for 2.5 hours. 500 cc. of liquid were distilled off while replacing it with 500 cc. of absolute ethyl alcohol. Dry HCl was bubbled vigorously into the reaction mixture for 5 minutes and then 1600 cc. of liquid were distilled off while replacing it with an equal volume of absolute ethyl alcohol. The reaction mixture was then concentrated under vacuum to obtain the reaction product as a heavy white precipitate. The reaction product, the dihydrochloride of 3-amino-4-methoxy-N-γ-dimethylaminopropylbenzenesulfonamide, was recovered by filtration and dried at 60° C. 123 grams of dried product were obtained.

Example 12

66 grams of 3-acetamino-4-methoxybenzenesulfonyl chloride were added with good stirring to 65 cc. of β-diethylaminoethylamine. After stirring one hour longer the reaction mixture was diluted by the addition of 15 grams of $Na_2CO_3$ dissolved in 65 cc. of water. An additional 200 cc. of water were added and the oily product, 3-acetamino-4-methoxy-N-β-diethylaminoethylbenzenesulfonamide, formed was recovered and washed several times with water by decantation.

The oil obtained as just described was dissolved in a mixture of 250 cc. of ethyl alcohol and 55 cc. of concentrated hydrochloric acid and the resulting mixture was refluxed for 5 hours. About 1200 cc. of liquid were distilled off while replacing it with an equal volume of absolute ethyl alcohol. The reaction mixture was then concentrated under vacuum and worked up as described in Example 11. The product obtained was the dihydrochloride of 3-amino-4-methoxy-N-β-diethylaminoethylbenzenesulfonamide.

The new aminobenzenesulfonamide compounds of the invention, such as those specifically mentioned hereinbefore, as well as 3-amino-4-ethoxy-N-β-diethylaminoethylbenzensulfonamide, for example, can be prepared following the procedures just described. It is not necessary to isolate the diazo component in its free amino form or its hydrochloride form in order to use them in the preparation of the new azo dye compounds of the invention.

Many of the primary amines having the Formula D are known compounds. Those that may not be specifically disclosed in the prior art can be prepared by the methods used to prepare the known compounds.

Two general processes by which primary amines having the Formula D can be prepared are set forth hereinafter:

(1) An amine having the formula:

(F)            $H_2N(R_1)_2$ is condensed with a chloroalkylnitrile having the formula: $Cl(CH_2)_xCN$, and the product obtained is reduced by sodium-alcohol or with hydrogen over Raney nickel to give:

(G)            $H_2N(CH_2)_{x+1}N(R_1)_2$ the desired product.

(2) Potassium phthalimide is condensed with a dibromoalkyl compound having the formula: $Br(CH_2)_zBr$ to obtain $C_6H_4(CO)_2N(CH_2)_zBr$ which is treated with F to give $$C_6H_4(CO)_2N(CH_2)_zN(R_1)_2$$

which is hydrolyzed with dilute mineral acid to give (H)            $H_2N(CH_2)_zN(R_1)_2$ the desired product. Method 2 is the well-known Gabriel synthesis.

In the two processes just described $R_1$ represents an alkyl radical having 1 to 4 carbon atoms, X is 1 or 2 and Z is 2 or 3. Compounds having the Formula D wherein $N(R_1)_2$ represents the morpholinyl radical or the piperidyl radical are obtained by using morpholine or piperidine in place of an amine compound having the Formula F.

The following example illustrates one way in which the azo compounds of the invention can be used to dye acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

The invention has been described in detail with particular reference to preferred embodiments thereof, but it will be understood that variations and modifications can be effected within the spirit and scope of the invention as described hereinabove and as defined in the appended claims.

We claim:

1. The azo compounds having the formula:

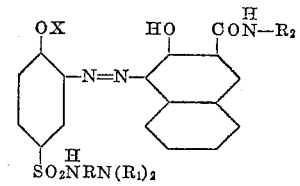

wherein X represents a member selected from the group consisting of a methyl radical and an ethyl radical, R represents an alkylene radical having 2 to 3 carbon atoms, $R_1$ represents an alkyl radical having 1 to 4 carbon atoms, $N(R_1)_2$ collectively represents a member selected from the group consisting of the morpholinyl radical and the piperidyl radical and $R_2$ represents a monocyclic aryl nucleus of the benzene series devoid of a water-solubilizing group.

2. The azo compound having the formula:

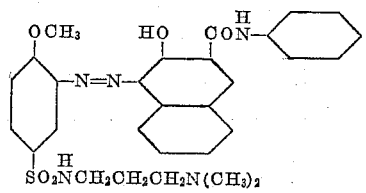

3. The azo compound having the formula:
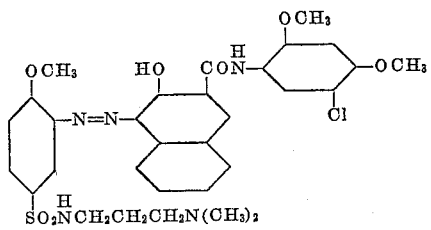
4. The azo compound having the formula:
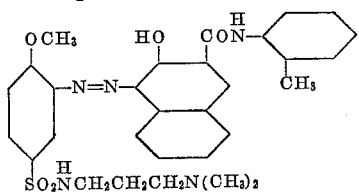
5. The azo compound having the formula:
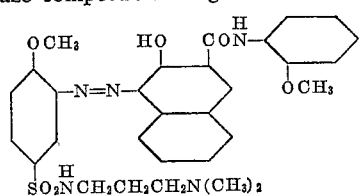
6. The azo compound having the formula:
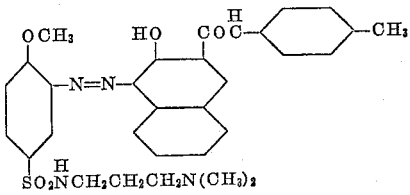
References Cited in the file of this patent
UNITED STATES PATENTS
| | | |
|---|---|---|
| 2,373,299 | Dougherty | Apr. 10, 1945 |
| 2,270,678 | Fischer | Jan. 20, 1942 |
| 2,644,819 | Dazzi | July 7, 1953 |
| 2,691,653 | Williams | Oct. 12, 1954 |
| 2,733,242 | Libby | Jan. 31, 1956 |
| 2,742,459 | Fischer | Apr. 17, 1956 |
| 2,863,875 | Bienert | Dec. 9, 1958 |
FOREIGN PATENTS
| | | |
|---|---|---|
| 761,085 | France | Jan. 3, 1934 |
| 1,222,318 | France | Jan. 18, 1960 |